United States Patent
Bolander

[19]

[11] Patent Number: 5,980,388
[45] Date of Patent: Nov. 9, 1999

[54] JOINT ASSEMBLY FOR LINKING END-ALIGNED SHAFT SEGMENTS

[75] Inventor: Timothy A. Bolander, Rockton, Ill.

[73] Assignee: Beloit Technologies, Inc., Wilmington, Del.

[21] Appl. No.: 08/915,027

[22] Filed: Aug. 20, 1997

Related U.S. Application Data

[60] Provisional application No. 60/024,322, Aug. 22, 1996.

[51] Int. Cl.⁶ ........................................ F16D 3/10
[52] U.S. Cl. ............................................. 464/160
[58] Field of Search ..................... 464/112, 125, 464/134, 160, 905; 403/378, 379

[56] References Cited

U.S. PATENT DOCUMENTS

| | | | |
|---|---|---|---|
| 1,029,764 | 6/1912 | Opsahl | 464/160 |
| 1,418,380 | 6/1922 | Keck | 464/125 |
| 1,550,779 | 8/1925 | Carpenter | 464/160 |
| 1,922,596 | 8/1933 | Mangold | 464/160 |
| 5,370,327 | 12/1994 | Adamski . | |

FOREIGN PATENT DOCUMENTS

| | | | |
|---|---|---|---|
| 348179 | 2/1922 | Germany | 464/160 |
| 1283920 | 8/1972 | United Kingdom | 464/160 |

*Primary Examiner*—Eileen Dunn Lillis
*Attorney, Agent, or Firm*—Raymond W. Campbell; Gerald A. Mathews

[57] ABSTRACT

A loose joint assembly for linking two segments of a shaft which are substantially aligned at either end of the joint assembly co-axially about a axis of rotation. The joint assembly includes a male coupling member disposed co-axially within a female coupling member with an intermediate bearing member to align the coupling members. The male coupling member has a plurality of circumferentially spaced flats located within the space enclosed by the female coupling member. A corresponding plurality of openings, preferably in the form of slots extending in the circumferential direction, are located in the female coupling member, each slot being aligned with a corresponding flat. A drive pin is attached to the male coupling member at each flat and extends radially from the flat and at least partially into the corresponding slot in the female coupling member. The dimension of each opening in the direction of the longitudinal axis is selected to be only slightly larger than the dimension of the portion of the drive pin extending through the opening. The dimension of the slot in the circumferential direction is selected to be longer than the diameter of the drive pin extending into the opening. This configuration permits a limited amount of relative angular rotation between the male and female coupling members for limiting angular misalignment between the shaft segments while also permitting the shaft segments to lock in movement together at the extreme of relative angular movement between the shaft segments in either direction. Removing the pins, or disengaging them from the openings, permits the joint assembly to collapse axially.

7 Claims, 3 Drawing Sheets

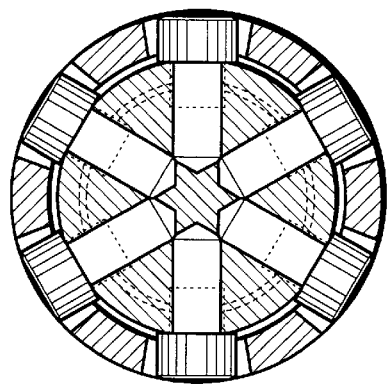
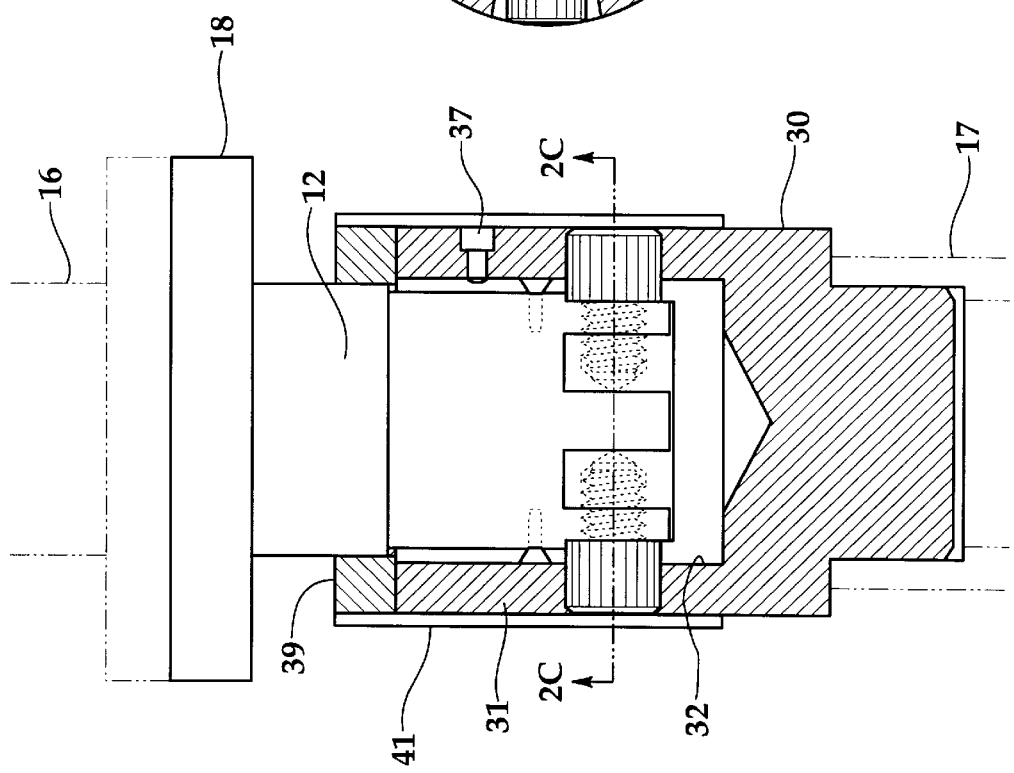
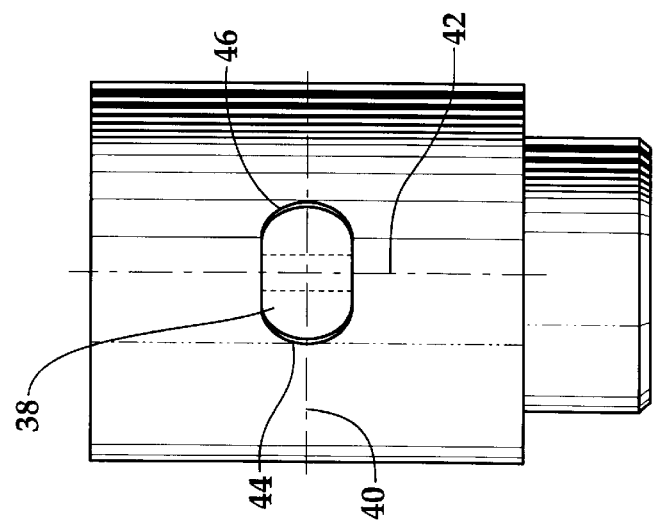

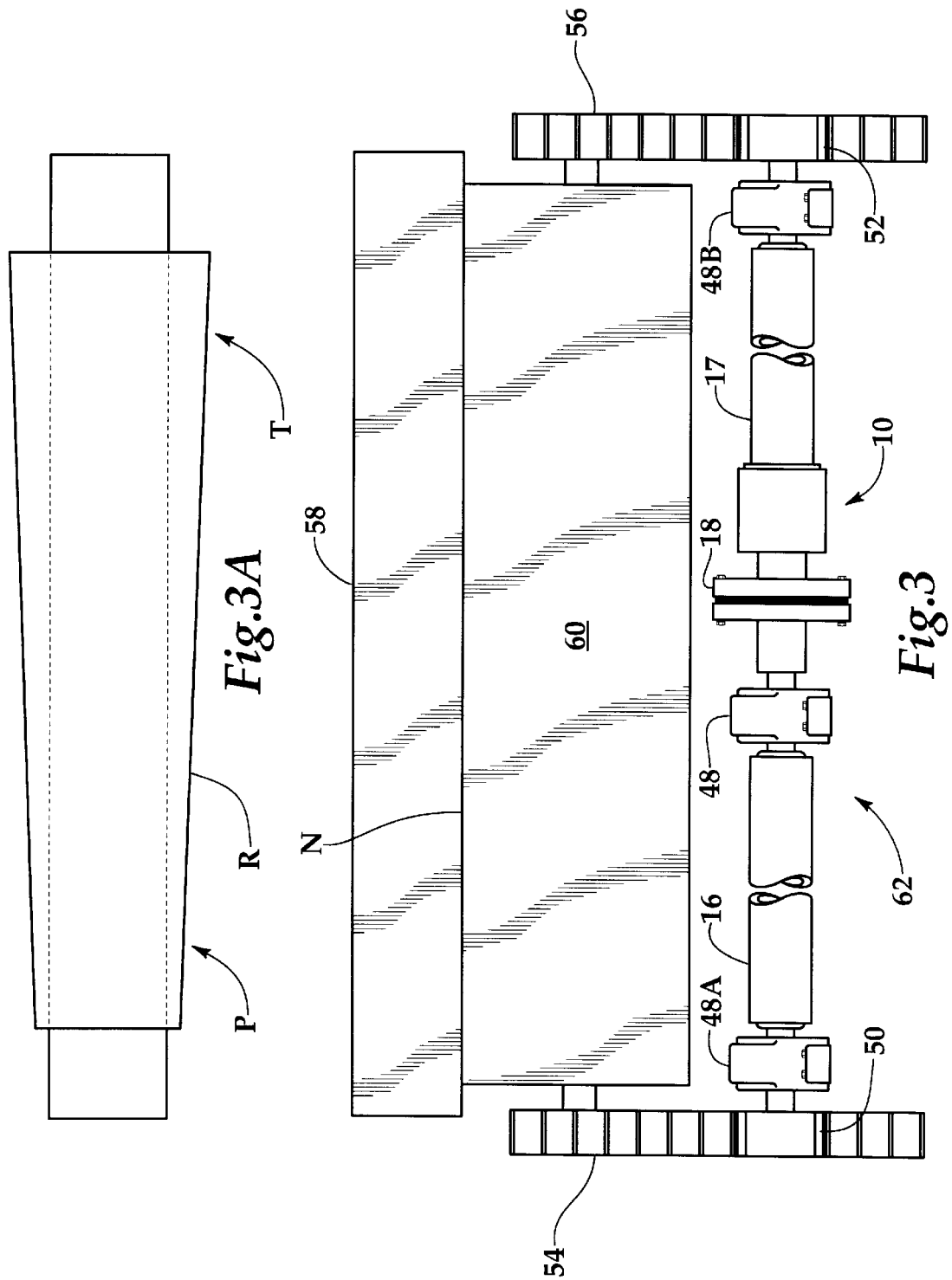

JOINT ASSEMBLY FOR LINKING END-ALIGNED SHAFT SEGMENTS

This application claims benefit of Provisional application Ser. No. 60/024,322 filed Aug. 22, 1996.

BACKGROUND OF THE INVENTION

Field of the Invention

This invention relates to a joint assembly for linking two, substantially end-aligned, shaft segments extending from either end of the joint assembly. More specifically, this invention relates to a loose joint assembly which permits a defined amount of movement between first and second coupling members along a rotational path about the center axis of the joint assembly. Such a joint assembly is useful in linking, and controlling relative movement between, apparatus-supporting components on either side of papermaking machine apparatus, such as a reel.

DESCRIPTION OF THE PRIOR ART

Heretofore, in a papermaking machine, when pairs of components on the front and back sides of the machine, such as pivotal arms or, more particularly, the rack in rack and pinion arrangements, have been utilized to coordinate the movement of the components on each side of the papermaking machine, the components have been connected by a single shaft. This arrangement generally works very well, but it has been determined that in some operating situations in some apparatus, a certain degree of looseness, or relative movement, between components on either side of the papermaking apparatus, is required to be accommodated. An example of apparatus which can benefit from such cross-machine relative movement accommodation is a new design of a reel used on a papermaking machine, which reel is shown and described in U.S. Pat. No. 5,370,327, the disclosure of which is incorporated herein by reference. Such a reel design utilizes a moveable support drum having substantially vertical movement which is provided by mounting the ends of the support drum on a rack and moving the rack in the desired vertical path by means of hydraulically driven pistons mounted in the reel frame on either side of the reel apparatus.

Since the reel support drum supports the paper web roll as it is being wound, and since the paper web roll is being wound onto a reel spool which, in turn, is supported by a pair of parallel, horizontally disposed rails, any difference in the diameter of the wound web roll on one side of the reel relative to the other side of the reel caused by small differences in the caliper, or thickness, of the paper web in the cross-machine direction results in a larger diameter of the paper web roll being accommodated at one end of its nip line of support with the support drum than at the other end. If the ends of the support drum are mounted in an apparatus which moves uniformly up or down, this difference in the diameter of the wound web roll can only be accommodated by having the unit nip load at one end of the support drum higher or lower than at the other end. This is very undesirable since nip load control is so vital to the internal structure and stresses of the paper in the wound paper web roll.

If both ends of the apparatus movably supporting the support drum are linked by a continuous shaft (i.e., a shaft having ends which do not move rotationally relative to each other; that is the shaft ends rotate together), which heretofore was the case, the rack supporting each end of the support drum in a reel must move exactly at the same time for the same distance. In the case where the web roll being wound has different diameters at either end, there is no way to vary the nip support in the cross-machine direction to accommodate such differences in wound roll diameter.

Accordingly, in current and prior papermaking apparatus, particularly reels designed in the genre shown in U.S. Pat. No. 5,370,327, the existence and use of a continuous shaft linking rotational or translationally moveable components on either side of the papermaking apparatus, while providing an ostensibly desirable uniform movement of the apparatus on each end of the machine, actually operates to link and bind the lifting or rotating supporting components together when absolutely uniform movement between the end supports at all times may be undesirable.

SUMMARY OF THE INVENTION

This invention obviates problems associated with rigidly linking translationally or rotationally moveable components at either end of apparatus used on a papermaking machine, such as a reel. In place of a continuous shaft, or a shaft comprising segments which are rigidly linked to one another, the joint assembly of this invention links shaft segments extending substantially co-axially from each end of the joint assembly in a manner whereby the shaft segments are permitted a small amount of rotational movement relative to one another. Beyond the small, but defined, amount of rotational movement, the shaft segments engage to transmit torque between them. In this manner, the so-called front and back sides (i.e., either side) of a reel can be linked together so that if their translational movement in support of corresponding ends of the web roll being wound are within predetermined amounts, then nothing more is required of the joint assembly. However, if one side of the papermaking machine/reel apparatus moves to the point where it seeks to move more than the desired amount relative to the other end, then the joint assembly essentially locks and requires the shafts to move together.

This relative rotational movement between ends of the joint assembly is accomplished by providing a first (male) coupling member with a plurality of radially extending pins which extend into correspondingly arranged slots in a second (female) coupling member disposed about the first coupling member. The dimensions of the pins and slots in the circumferential direction about the joint define the extent of the desired predetermined looseness, or rotational movement, of the joint assembly. This looseness thereby permits the support drum, in the type of reel shown in the U.S. Pat. No. 5,370,327 patent, to remain in substantially straight-line nip supporting engagement with a web roll having a non-uniform diameter along its length extending in the direction of its longitudinal axis.

Additionally, in the event that the apparatus in which the shaft segments and joint are mounted is to be disassembled for repair or rebuilding any of its components, the joint assembly can be collapsed axially by removing the pins, or by permitting the pins to become disengaged from the female coupling member.

Accordingly, it is an object of this invention to provide an improved joint for linking shaft segments extending from either end of the joint assembly.

Another object of this invention is to provide a joint assembly capable of having a predetermined amount of rotational looseness between shaft segments attached at either end of the joint assembly.

A feature of this invention is to provide a joint assembly having the ability to collapse axially to facilitate its use when it is desired to replace or rebuild components in apparatus utilizing the joint assembly.

Yet another object, feature and advantage of this invention is to operatively link shaft segments mounted to either end of the joint assembly while providing the capability of linking the shaft segments with a predetermined limited amount of rotational movement and to lock the shaft segments together when the predetermined limit of rotational movement has been reached between the shaft segments.

These, and other objects, features and advantages of the invention will be readily apparent to those skilled in the art upon reading the following description in conjunction with the attached drawings.

BRIEF DESCRIPTION OF THE DRAWINGS

FIG. 2A is a plan view, partially in section, of another embodiment of the joint assembly of the invention.

FIG. 2B is a plan view showing the slot-like opening in the second coupling member.

FIG. 2C is an elevational view along Section 2—2 in FIG. 2A.

FIG. 3 is a front elevational view of a support drum in a reel, shown somewhat schematically, and showing the rack and pinion arrangement on the front and back sides of the reel where the pinions are linked by shaft segments attached to, and extending from, the joint assembly of this invention.

FIG. 3A is a front elevational view of a reel spool on which a paper web having greater caliper at its right end is shown being wound into a wound web roll on the reel spool and shown greatly exaggerated for purposes of illustration.

DESCRIPTION OF THE PREFERRED EMBODIMENTS

Figure 1C:
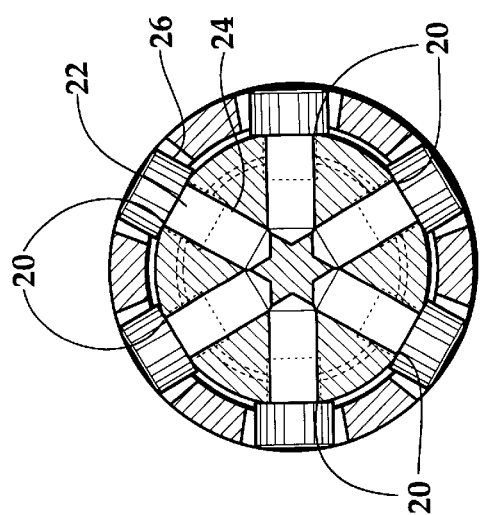
FIG. 1C is an elevational view along Section 1—1 in FIG. 1A.
Figure 1A:
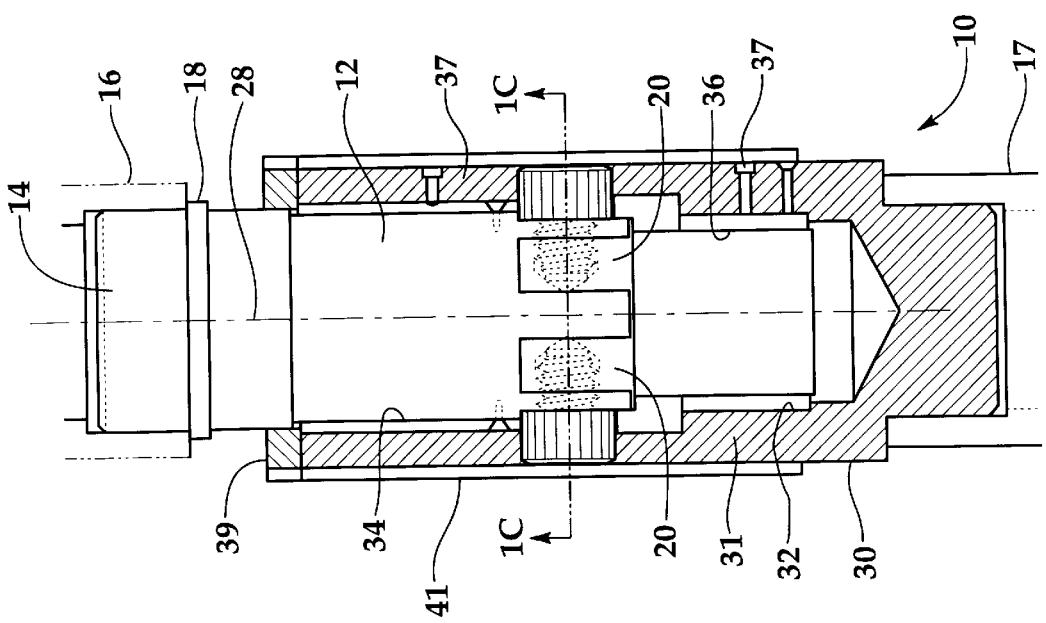
FIG. 1A is a plan view, partially in section, showing the joint assembly of this invention.
Figure 1B:
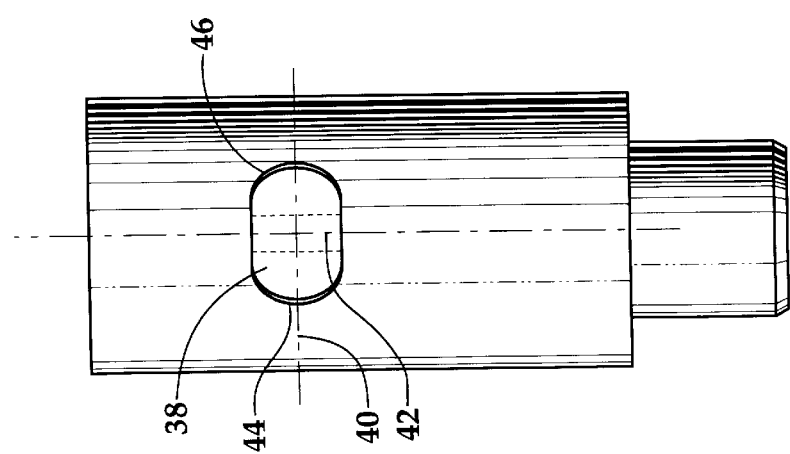
FIG. 1B is a plan view similar to FIG. 1A, but showing the slot-like opening in the second coupling member.

With reference to FIGS. 1A, 1B, 1C the joint assembly, designated generally by the numeral 10, has a first coupling member 12, in the shape of a stub arbor and having one end 14 adapted to the attached to a shaft segment 16 by suitable means, such as being welded or bolted (not shown) to a flange 18. The stub arbor, which is also the first coupling member of the joint assembly, has a plurality of flats 20 which, in the preferred embodiment, comprise a plurality of relatively small, flat surfaces machined on the outer periphery of the cylindrical arbor. These flats are arrayed circumferentially and are equally spaced in a preferred embodiment.

In the preferred embodiment, a socket-head capscrew 22 is mounted into a hole 24 drilled into each of the flats such that its head 26 seats against the flat surface and extends radially outwardly from the longitudinal axis of rotation 28 of the stub arbor. These holes for the screws can also be referred to as designated positions.

Disposed concentrically about the stub arbor and its longitudinally axis is a second coupling member 30 which has a cylindrical wall 31 defining a cavity 32 formed in it to receive the stub arbor. Mounted within the cavity of the second coupling member are first and second bearings 34, 36 which position and mount the stub arbor in a desired location within the second coupling member.

Located within the second coupling member 30 are a plurality of openings 38, corresponding in number to the plurality of capscrews 22, which slots are positioned to receive the head 26 of each capscrew extending outwardly from the stub arbor. In a preferred embodiment, each of the openings 38 comprises a slot having a long axis 40 extending circumferentially relative to the first and second coupling members, and a short axis 42 extending parallel to the longitudinal, rotational axis 28 of the arbor and joint assembly. The dimension along the short axis 42 is selected to be slightly larger than the diameter of the head of the capscrews such that the capscrews can be turned without undesirable frictional engagement with the walls of the opening in the second coupling member.

The dimension of the opening 38 in the circumferential direction is chosen to permit a desired amount of relative rotation between the first and second coupling members. In a preferred embodiment, openings 38 take the form of slots having ends 44, 46 which are rounded to generally conform with the semi-circular shape of the heads of the capscrews.

In a preferred embodiment, the openings 38 take the form of slot-shaped holes extending through the walls of the second coupling member such that the socket-head capscrews can be unscrewed and removed radially outwardly from the stub arbor (first coupling member). Such slots have at least two parallel walls extending circumferentially to facilitate the desired relative rotational movement between the first and second coupling members.

The embodiment shown in the FIG. 2 series is similar to the embodiment shown in FIG. 1 except that it contains only one bearing 34a. The need for two bearings in the FIG. 1 series embodiment, or the lack of a need for two bearings in the FIG. 2 series embodiment, essentially is a function of the effective length of the cross-machine shaft on which the joint assembly is a component. If the overall shaft length is relatively long, and there is no intermediate rotational support, then the two bearing arrangement would be used to maintain shaft rigidity. Conversely, for relatively short overall length shafts, or long shafts which utilize an intermediate bearing support 48, as shown in FIG. 3, a single bearing arrangement can be utilized.

In both embodiments, there are lubrication fittings 37 for lubricating the bearings 34, 34a, 36. A seal 39 is mounted on the stub arbor to seal the end of the second coupling member against the stub arbor. An elastomeric sleeve, or boot, 41 is disposed over seal 39 and the effective length of the second coupling member 30 to protect the joint assembly from contaminants.

Referring to FIG. 3, the joint assembly is shown somewhat schematically in a reel configuration wherein the end-aligned shaft segments 16, 17 are attached to either end of the joint assembly and have pinions 50, 52 at the distal ends thereof for engaging racks 54, 56. The racks are essentially straight and are mounted to the frame of the reel for movement substantially vertically. The reel support drum in a reel of the genre shown in U.S. Pat. No. 5,370,327 is rotatably mounted in bearing housings (not shown) mounted to the racks so as to move up and down substantially vertically with the rack at either end of the papermaking machine reel in operation. An empty reel spool 58 is shown in position above the support drum 60 in nipping engagement along a nip line of contact N with the support drum.

One of the chronic problems in the operation of papermaking machinery is variations in the paper web caliper (i.e., thickness) in the cross-machine direction. Such variations are commonly caused by variations in the amount of stock slurry deposited on the forming wire(s) in the forming section of the papermaking machine where more pulp fibers are deposited in one location in a cross-machine direction than at another location. However, variations in caliper can be promulgated by deficiencies in components, or the operation of such components, in the papermaking process as well.

When variations in caliper or profile occur, the paper web being wound into a roll R on the reel becomes larger in diameter at one location in the cross-machine direction than at other locations. A greatly exaggerated such situation is shown in FIG. 3A where the paper web has a greater caliper at the end of the roll generally designated T than at the other end of the roll generally designated P.

Accordingly, since it is desirable to maintain as uniform of nip contact and support by the support drum against the web roll being wound as possible along the length of the nip line of contact, it is readily apparent that if the diameter of the wound web roll is larger at one end of the roll than at the other end, the nip support will not be uniform if the support drum is raised and lowered uniformly translationally as a function of the increasing diameter of the web roll being wound. Therefore, with reference to FIG. 3, if the shaft, generally designated with the number 62, extending between the front and back sides, or either end, of the reel moves with the corresponding racks 54, 56 perfectly in unison, the surface of the support drum will also move translationally horizontally, but the nip support of the wound web roll will then be non-uniform due to the variation in its diameter caused by variations in the cross-machine web caliper. Stated another way, the seemingly coordination between movement of the racks supporting the rotational shaft at each end of the support drum is actually deleterious to the desired uniform support of the wound paper web roll along the length of the nip line contact, due to variations in the diameter of the wound web roll.

This invention permits operation of the reel to accommodate variations in the diameter of the wound web roll, within desired limits, by permitting relative differences in the amount of rotation of the shaft segments 16,17 extending from either end of the joint assembly 10, which relative rotation is a function of differences in movement of the racks on either side of the apparatus as they move to keep the nip pressure equal along the nip line across the length of the support drum. With reference to FIGS. 1A, 1B, 1C, when variations in the caliper between the ends of the web roll being wound are detected, the second coupling member 30 can rotate along the path of an arc about the longitudinal axis 28 relative to the first coupling member 12 due to the circumferentially extending spaces provided by the slots 38 relative to the capscrews 22. The amount of looseness or tolerance in this relative rotation is determined (i.e., defined) by the length of the slots. Such relative movement between the first and second coupling members, and the corresponding attached shaft segments, causes, permits, or is the result of corresponding differences in the relative movement of the racks supporting the ends of the support drum to maintain a more uniform nip line of contact. This permits the surface of the support drum to be skewed to more accurately conform with the non-horizontal surface of the web roll being wound, which non-horizontal surface is caused by a variation in paper web caliper in the cross-machine direction.

At the extreme ends of relative movement between the first and second couplings, the heads 26 of the capscrews engage the end walls 44 or 46 of the openings 38 and the first and second coupling members are then caused to rotate together to maintain a predetermined relationship between the positions of the apparatus at the front and back sides of the reel supporting the support drum. At this point in the operation, the pinions at either end of the composite shaft rotate together and the support drum maintains its position of attitude relative to the web roll being wound. This is done to insure that extremes in caliper variation do not cause the support drum to become skewed in a manner where it becomes dangerous to the operation of the overall reel apparatus.

Clearly, variations in the structure of the preferred embodiments can be made by a person skilled in the art without departing from the spirit and scope of the invention. Thus, the shape of the opening 38 can take other forms, such as, for example, a rectangle. Further, it is contemplated that the openings need not extend all the way through the second coupling member, but could only extend for a shorter distance to accommodate the heads of the capscrews which could then either be inserted along longitudinally extending slots, or be collapsed into the stub arbor comprising the first coupling member.

The capscrews themselves could be replaced by dowels or pins press fitted into holes in the stub arbor. The flats 20 themselves need not be formed in the stub arbor so long as the capscrews, dowels or pins are fastened to extend radially outwardly from designated positions on the cylindrical surface of the stub arbor a distance sufficient to engage the openings in the second coupling member.

While in the preferred embodiment, the designated positions/flats 20, and the matching openings 38, are arrayed circumferentially, evenly spaced about the first and second coupling members, it is only important that the capscrews/ dowels/pins align in the prescribed manner with the openings to permit the desired rotational relative movement between them. Therefore, the particular circumferential spacing configuration of the openings 38 and capscrews 22 is a design consideration, not a necessity.

Finally, this joint assembly can be readily collapsed axially to provide for easy removal of the shaft from the apparatus, or removal or replacement of other components engaged by the shaft. This would be done, for example, by removing the capscrews and permitting the first and second coupling members to move axially relative to one another.

Thus, an improved joint assembly having desired flexibility, looseness and defined rotational limits has been described and shown. While specific terms and preferred embodiments are shown and described, they are used in a generic and descriptive sense only, and are not intended for purposes of limitation, the scope of the invention being set forth in the following claims.

I claim:

1. A joint assembly for linking two substantially end-aligned shaft segments at either end of the joint assembly, the joint assembly having defined limited capability to permit the shaft segments to move rotationally relative to one another, comprising, in combination:

a first coupling member having a stub arbor with a plurality of designated positions disposed about the surface thereof;

a second coupling member having a wall defining a cavity for receiving and enclosing the stub arbor, and including a plurality of openings extending into the wall of the second coupling member, the openings arrayed to be located over the designated positions on the stub arbor;

a plurality of pin means mounted to the first coupling member at the designated positions, the pin means extending outwardly and into the plurality of openings;

whereby the size and shape of the openings are so constructed and arranged as to intersect and engage the pin means upon relative rotational movement between the first and second coupling members, so as to permit defined rotational looseness between the two shaft segments before the coupling members come into co-rotational engagement at the limit of the defined looseness.

2. A joint assembly as set forth in claim 1, wherein:

the openings in the wall of the second coupling member are arrayed spaced substantially circumferentially about the periphery of the wall.

3. A joint assembly as set forth in claim 1, wherein:

the designated positions each include a flat formed in the surface of the stub arbor.

4. A joint assembly as set forth in claim 1, wherein:

the designated positions include a flat formed in the surface of the stub arbor;

the pin means comprises capscrews having heads, the capscrews extending radially inwardly into the flats and normal thereto.

5. A joint assembly as set forth in claim 1, further including:

at least one bearing means mounted on the stub arbor for rotationally supporting the second coupling member about the stub arbor.

6. A joint assembly as set forth in claim 1, wherein:

the openings comprise a plurality of slots having at least two parallel walls, the slots having a dimension in the long direction of the slot greater than the corresponding dimension of the cross-section of the pin means so as to permit relative rotational movement between the first and second coupling members.

7. A joint assembly for linking two substantially end-aligned shaft segments at either end of the joint assembly, the joint assembly having defined limited capability to permit the shaft segments to move rotationally relative to one another, comprising, in combination:

a first coupling member having a stub arbor with a plurality of flats arrayed circumferentially about the surface thereof;

a second coupling member having a wall defining a cavity for receiving and enclosing the stub arbor, and including a plurality of slot openings extending through the wall of the second coupling member, the slot openings arrayed to be located over the flats on the stub arbor;

a plurality of pin means mounted to the first coupling member on the flats, the pin means extending outwardly and into the plurality of slot openings;

whereby the size and shape of the slot openings are so constructed and arranged as to intersect and engage the pin means upon relative rotational movement between the first and second coupling members, so as to permit defined rotational looseness between the two shaft segments before the coupling members come into co-rotational engagement at the limit of the defined looseness.

\* \* \* \* \*